(12) United States Patent
Gan et al.

(10) Patent No.: US 6,639,814 B2
(45) Date of Patent: Oct. 28, 2003

(54) CONSTANT VOLTAGE RESET CIRCUIT FOR FORWARD CONVERTER

(75) Inventors: Hongjian Gan, Taoyuan Shien (TW); Zhongwei Ke, Taoyuan Shien (TW); Chaoqun Sun, Taoyuan Shien (TW); Alpha J. Zhang, Taoyuan Shien (TW)

(73) Assignee: Delta Electronics, Inc., Taoyuan Shien (TW)

( * ) Notice: Subject to any disclaimer, the term of this patent is extended or adjusted under 35 U.S.C. 154(b) by 0 days.

(21) Appl. No.: 10/011,541

(22) Filed: Dec. 3, 2001

(65) Prior Publication Data

US 2003/0103362 A1 Jun. 5, 2003

(51) Int. Cl.$^7$ .................. H02M 3/335; H02H 7/122
(52) U.S. Cl. ...................... 363/25; 363/56.06
(58) Field of Search .................. 363/21.04, 21.05, 363/24, 25, 55, 56.01, 56.06

(56) References Cited

U.S. PATENT DOCUMENTS

| | | | | |
|---|---|---|---|---|
| 4,975,821 A | * | 12/1990 | Lethellier | 363/21 |
| 6,282,107 B1 | * | 8/2001 | Vinciarelli | 363/56.09 |
| 6,452,814 B1 | * | 9/2002 | Wittenbreder | 363/16 |

* cited by examiner

*Primary Examiner*—Adolf D. Berhane

(57) ABSTRACT

A constant voltage reset circuit used in a forward converter for the holdup time requirement or the wide input voltage range is disclosed. In one embodiment, the constant voltage reset circuit comprises a reset capacitor, a parallel-coupled switch, and a diode coupled in series with the reset capacitor which is configured to cooperate therewith to reset an energy from the transformer. The forward converter employing the reset circuit or the method achieves a higher efficiency with a larger turn ratio and without the 50% limitation of maximum duty cycle.

14 Claims, 14 Drawing Sheets

S1, S2

CONSTANT VOLTAGE RESET CIRCUIT FOR FORWARD CONVERTER

FIELD OF THE INVENTION

This invention relates generally to power supply systems that performs DC-DC conversion operations, and more particularly, this invention relates to a constant voltage reset circuit for the forward converter to operate the converter more efficiently in applications of the holdup time requirement and the wide input voltage range operation.

BACKGROUND OF THE INVENTION

DC-DC converters are most commonly used in various power supplies. The input of the DC-DC Converter can be a fixed DC voltage with pre-regulator or a wide range DC voltage.

FIG. 1a shows the conventional configuration and FIG. 1b to FIG. 1d show key operation waveforms of the dual switch forward DC-to-DC converter. When the two switches, S1 and S2, turn on simultaneously, the primary winding of the transformer Tr is magnetized by the input voltage Vin. And when the two switches S1 and S2 turn off simultaneously, the transformer winding is demagnetized reversely by the input voltage Vin through two clamping diodes Da1 and Da2. The reset voltage is equal to the input voltage. In order to keep the voltage-second balance of the transformer winding, the duty-cycle of the forward converter is limited within 50%.

A drawback associated with foregoing DC-DC converter is that the converter operates in a small duty cycle with low efficiency under normal high input, since the converter is designed at minimum input voltage with a limited maximum duty cycle of 50%. The smaller the duty cycle is, the smaller the turn ratio of transformer will be, and thus the larger the RMS current of the primary side is, the larger the conduction loss and the switching loss of the main switches will be. Meanwhile, the smaller the turn ratio of transformer is, the higher the voltage rating of the second side of the rectifier with the higher conduction voltage drop and the bigger size of output filter will be.

SUMMARY OF THE INVENTION

It is an object of the present invention to extend the switch duty cycle to ensure a higher conversion efficiency for wide input operation range.

It is another object of the present invention to minimize the bus capacitor for a given holdup time requirement.

It is another object of the present invention to lower the voltage rating and to lower the conduction loss of the second side of the rectifier.

According to an aspect of the present invention, a constant voltage reset circuit for a forward converter is proposed. The constant voltage reset circuit comprises a reset capacitor, a parallel-coupled switch, and a diode coupled in series with the reset capacitor, which is configured to cooperate therewith to reset energy from the transformer.

According to another aspect of the present invention, a constant voltage reset circuit is employed on the isolated power supply of a transformer of a forward converter. The constant voltage reset circuit is capable of demagnetizing the transformer and is further capable of recovering the energy stored in the transformer with a constant voltage reset to extend the switch duty cycle higher than 50% at runnable minimum input to improve the overall performance of the converter.

In one embodiment of the present invention, the constant voltage reset circuit further comprises a logic control unit coupled to the switch which is configured to enable the reset voltage of the forward converter to be almost constant even when the input of the forward converter drops to a lower voltage.

In one embodiment of the present invention, the diode is selected from a separated diode, a zener diode and a body diode of the switch such as a MOSFET.

In one embodiment of the present invention, a resistor is further connected in parallel with the diode.

In one embodiment of the present invention, the logic control unit includes a zener diode and a transistor biased through the zener diode.

Other objects, features and advantages of the present invention will become apparent from the following detailed description with reference to the accompanying drawings.

BRIEF DESCRIPTION OF THE DRAWINGS

For a more complete understanding of the present invention, references are now made to the following descriptions taken in conjunction with the accompanying drawings, in which.

DETAILED DESCRIPTION OF THE PREFERRED EMBODIMENT

Figure 1A:
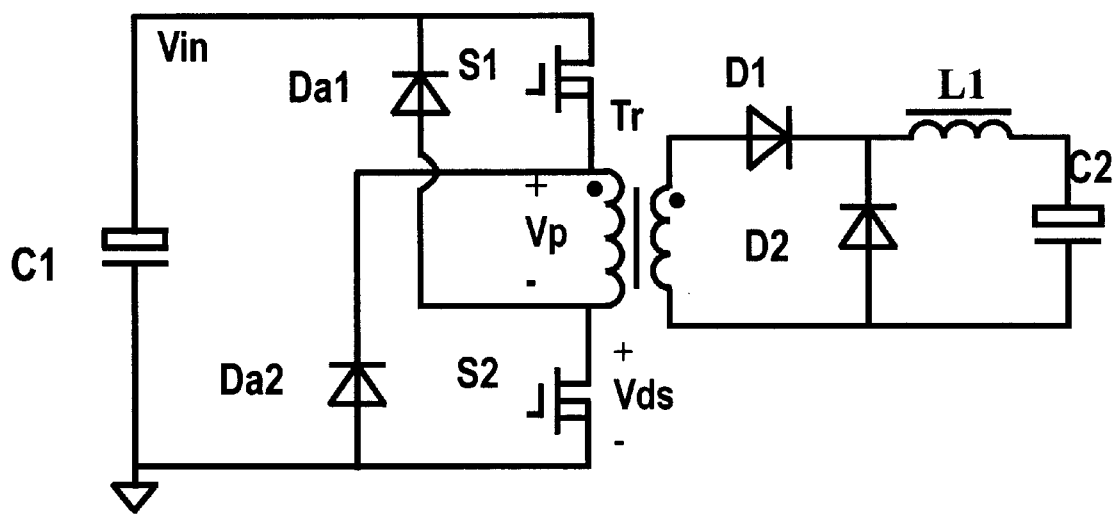
FIGS. 1a, 1b, 1c and 1d show the configuration and key operation waveforms of a conventional dual switch forward DC-to-DC converter.
Figure 1B:
Figure 1C:
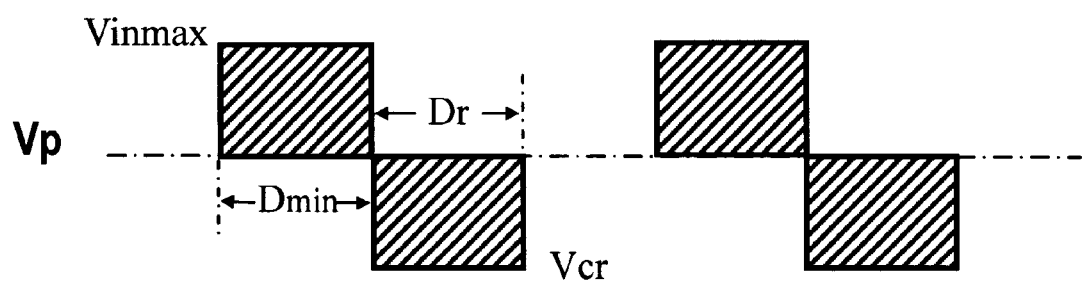
Figure 1D:
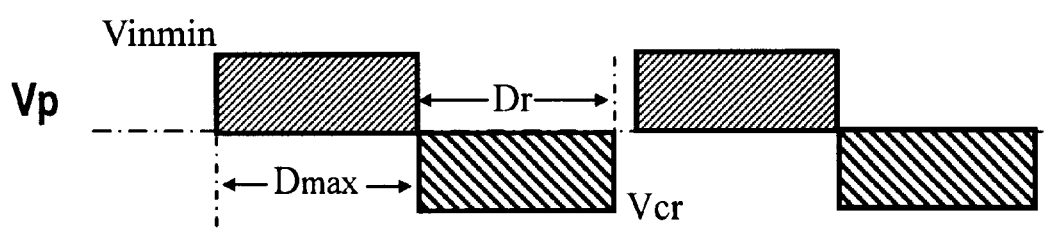
Figure 2A:
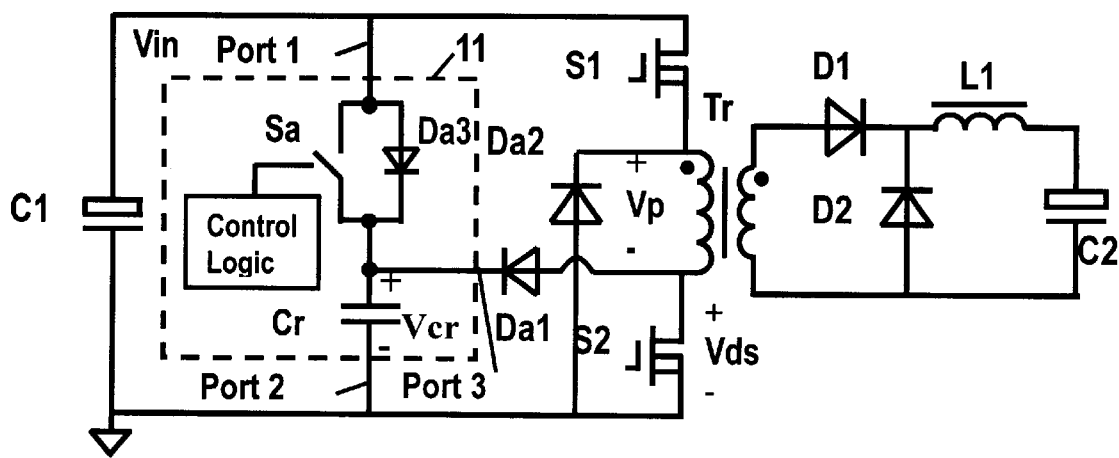
FIGS. 2a, 2b, 2c and 2d show circuit diagrams and key operation waveforms of a particular type of constant voltage reset dual switch forward DC-DC converter according to a first preferred embodiment of the present invention.
Figure 2B:
Figure 2C:
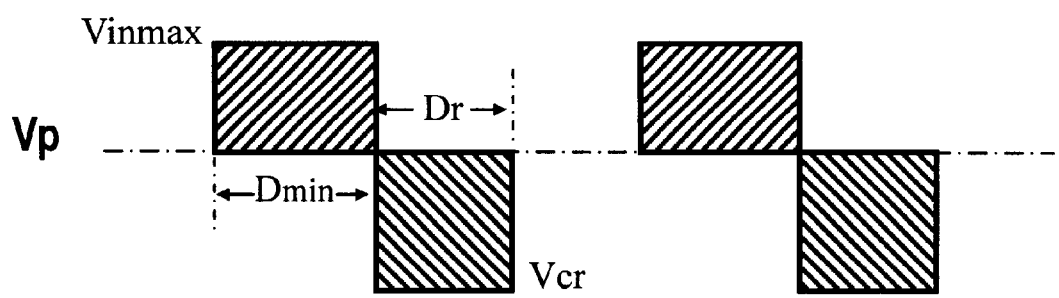
Figure 2D:
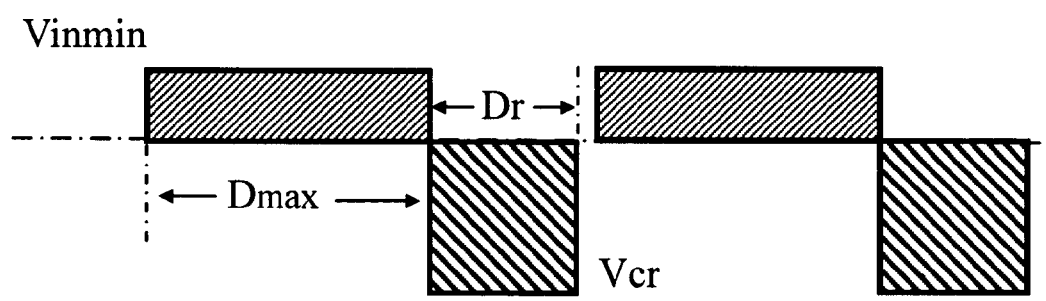

Referring to FIGS. 2a, 2b, 2c and 2d, the configuration and key operation waveforms of a particular type of constant voltage reset dual switch forward DC-DC converter according to a first alternate embodiment of the present invention is illustrated. The invention differs from the prior art described in FIG. 1a in terms of the reset means in which a constant voltage is applied to reset the transformer during a variable input bus by inserting a constant voltage reset circuit 11 to a conventional dual switch forward converter, one of the clamping diode of the forward converter connecting to one port of the reset circuit. The constant voltage reset circuit comprises a reset capacitor Cr, a parallel-coupled switch Sa, and diode Da3, which are coupled in series with the reset capacitor Cr, and a control logic unit is coupled to the switch Sa to control the voltage of the reset capacitor Cr.

In the high input voltage operating mode, the switch Sa is controlled to turn on by the control logic unit, the reset capacitor Cr is shorted to input DC bus, the reset voltage is equal to the bus voltage, the operation of the converter is the same as that of a conventional dual switch forward converter, and all of the magnetizing energy is fully recycled. When the input voltage fails, then the DC bus will drop, the control logic unit will activate a holdup operating mode for the converter by turning off the switch Sa, the reset capacitor will be separated from DC bus, and the reset voltage at capacitor Cr will not drop but keep unchanged as normal high input bus voltage. Thus, higher reset voltage is maintained when input bus voltage drops. The runnable maximum switching duty cycle Dmax can be expressed as:

$$D_{max} = \frac{Vcr}{Vcr + Vin_{min}}$$

Where Vcr is the voltage of reset capacitor Cr, and Vin min is the runnable minimum bus voltage.

As an example, if the bus voltage at normal operation is 72V, the runnable minmum bus voltage is 36V, and the reset voltage Vcr is 72V. Then the maximum limited duty Dmax can be extended to 66.7%. Therefore with the constant voltage reset, the turn ratio of the converter can be selected larger than that of a conventional dual switch forward converter. The larger the turn ratio of transformer is, the larger the operating duty cycle will be, and thus the smaller the RMS current of the primary side is, the smaller the conduction and the turn off loss of the main switches will be. Meanwhile, the larger the turn ratio of transformer is, the lower the voltage rating of the second side of the rectifier with the lower conduction voltage drop and the smaller size of output filter will be. Thus, the present invention promises a significant efficiency improvement in a DC/DC converter.

Figure 3:
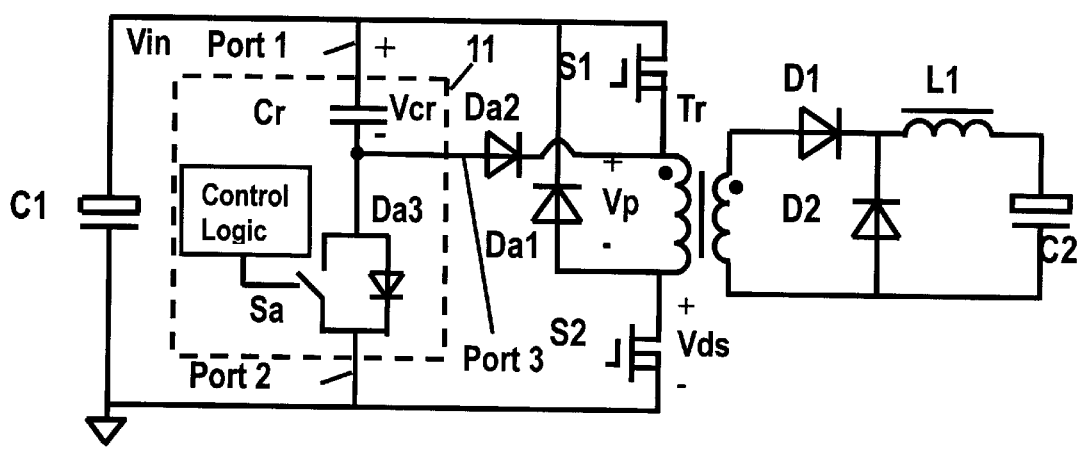
FIG. 3 is a circuit diagram of a particular type of constant voltage reset dual switch forward DC-DC converter according to a second preferred embodiment of the present invention.

FIG. 3 is another configuration of the present invention. As shown in FIG. 3, the constant voltage reset circuit 11 comprises a reset capacitor Cr, a parallel-coupled switch Sa, and diode Da3, which further includes a control logic unit being coupled to the switch Sa to control the voltage of the reset capacitor Cr. This configuration is easy for the designing of the gate driving of the switch Sa.

Figure 4:
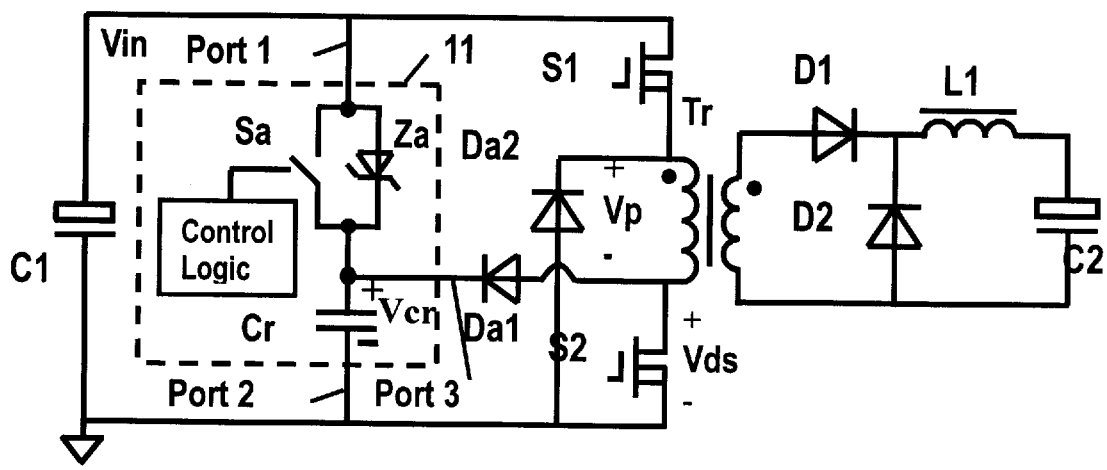
FIG. 4 is a circuit diagram of a particular type of constant voltage reset dual switch forward DC-DC converter according to a third preferred embodiment of the present invention.

FIG. 4 shows another configuration by replacing diode Da3 with a zener diode Za in the constant voltage reset circuit 11. The zener diode Za can limit the voltage difference between the reset voltage and the DC bus voltage during the dropping of the DC input bus.

Figure 5:
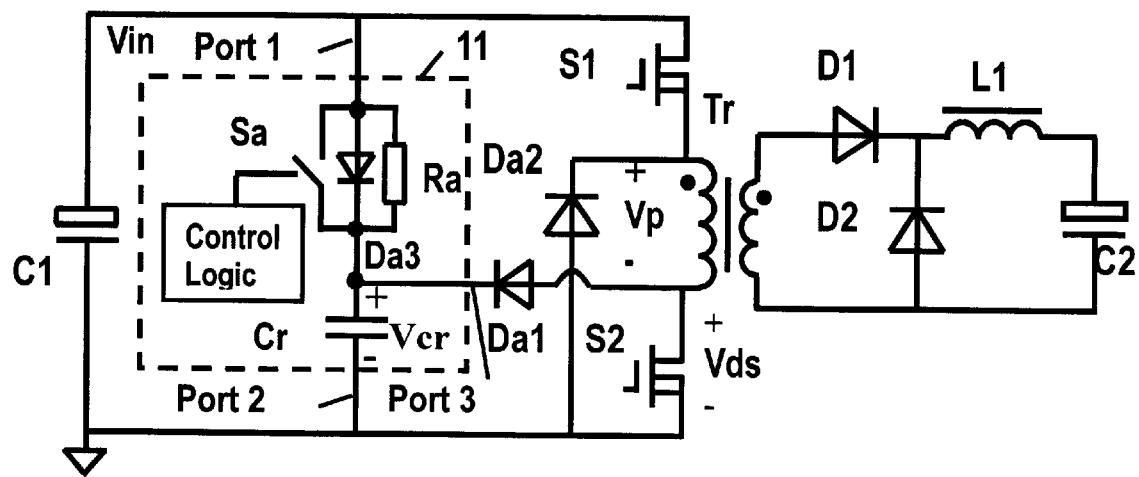
FIG. 5 is a circuit diagram of a particular type of constant voltage reset dual switch forward DC-DC converter according to a fourth preferred embodiment of the present invention.

FIG. 5 shows another configuration by connecting a resistor Ra in parallel with diode Da3 in the constant voltage reset circuit 11. The resistor Ra keeps the reset voltage in a certain range by discharging part of the magnetizing energy to DC bus when input bus drops.

Figure 6:
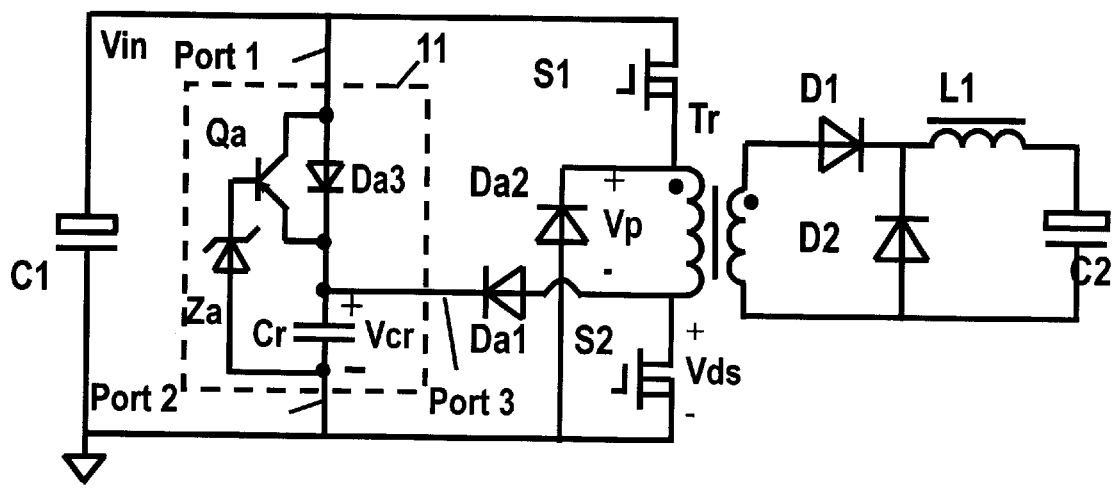
FIG. 6 is a circuit diagram of a particular type of constant voltage reset dual switch forward DC-DC converter according to a fifth preferred embodiment of the present invention.

FIG. 6 shows another configuration of embodiment of the logic unit of the constant voltage reset circuit 11. This voltage reset circuit keeps a constant voltage reset in both normal operation and holdup operation by replacing switch Sa and logic unit with a biased transistor and a zener diode respectively.

Figure 7:
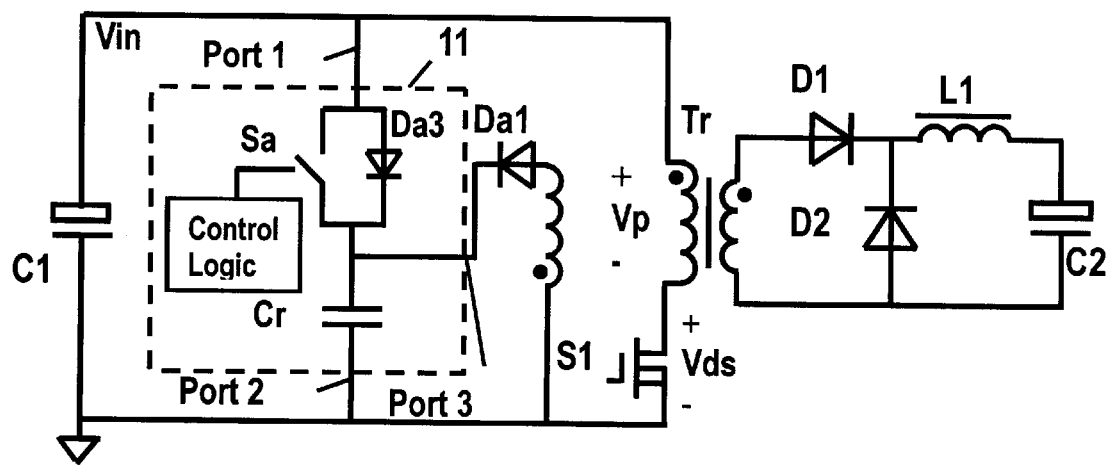
FIG. 7 is a circuit diagram of a particular type of constant voltage reset dual switch forward DC-DC converter according to a sixth preferred embodiment of the present invention.

FIG. 7 is a circuit diagram of another configuration of this invention as applied to a particular type of constant voltage reset single switch forward DC-DC converter. Compared with a conventional single switch forward converter having a third winding reset, this converter connects the third reset winding to reset the port of a constant voltage reset circuit 11 via a diode Da1. The reset circuit shown in FIG. 7 is the same as that of FIG. 2a, and can be replaced by those shown in FIG. 3, FIG. 4, FIG. 5 and FIG. 6.

Figure 8:
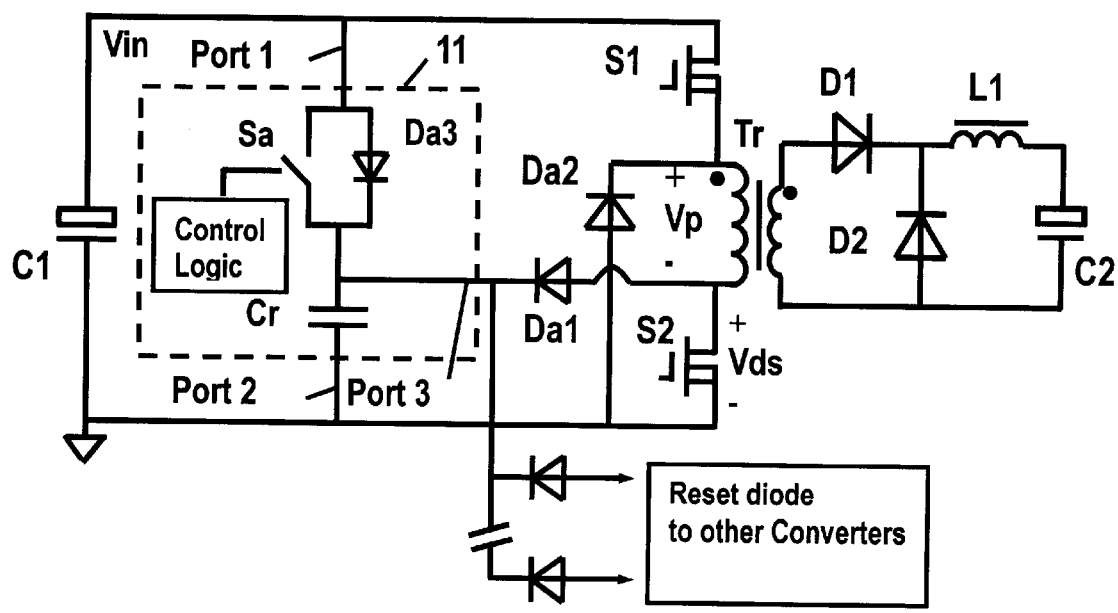
FIG. 8 is a circuit diagram of a particular type of constant voltage reset dual switch forward DC-DC converter according to a seventh preferred embodiment of the present invention.

FIG. 8 is a circuit diagram of this invention as applied to a particular type of the multi-module DC/DC converter. Two or more converter modules share the same constant voltage reset circuit 11 by organizing the reset diode to the same reset terminal. The constant voltage reset circuit shown in FIG. 8 is the same as that of FIG. 2a, and can be replaced by any kind of reset circuit shown in FIG. 3, FIG. 4, FIG. 5 and FIG. 6.

Although the present invention has been described in terms of the presently preferred embodiment, it is to be understood that such a disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

What is claimed is:

1. A constant voltage reset circuit for use in a forward converter having a transformer, comprising:

a reset capacitor;

a parallel-coupled switch and a diode coupled in series with said reset capacitor, which is configured to cooperate therewith to reset an energy from said transformer; and a logic control unit coupled to said switch which is configured to control a reset voltage of said voltage reset circuit to keep said reset capacitor with a sufficient reset voltage when an input power of said forward converter drops to a certain voltage.

2. The reset circuit as recited in claim 1 wherein said diode is selected from a group consisting of:

a single diode;

a body diode of a metal-oxide-semiconductor field-effect transistor; and a zener diode.

3. The reset circuit as recited in claim 2 wherein a resistor is further connected in parallel with said diode.

4. The reset circuit as recited in claim 1 wherein said logic control unit comprises a zener diode and a transistor which is biased through said zener diode.

5. A method of resetting a transformer of a forward converter comprising:

charging a reset capacitor to a voltage level equal to a power source of said forward converter;

resetting said transformer of said forward converter by a parallel-coupled switch and a diode coupled in series with said reset capacitor, which is configured to cooperate therewith to reset an energy from said transformer; and controlling a reset voltage of said voltage reset circuit by a logic control unit coupled to said switch to keep said reset capacitor with a sufficient reset voltage when input power of said forward converter drops to a certain voltage.

6. The method as recited in claim 5 wherein said diode is selected from a group consisting of:

a single diode;

a body diode of a metal-oxide-semiconductor field-effect transistor; and a zener diode.

7. The method as recited in claim 6 wherein a resistor is further connected in parallel with said diode.

8. The method as recited in claim wherein said logic control unit comprises a zener diode and a transistor which is biased through said zener diode.

9. A forward converter for being coupled to a DC power source, comprising:

at least one power switch that turns on alternately to transfer an energy from said DC power source to an DC output of said converter;

a transformer having a primary winding coupled in series with said power switch;

a voltage reset circuit coupled across said power switch and said primary winding and to one terminal of said primary winding, including:

a reset capacitor, a parallel-coupled switch and a diode coupled in series with said reset capacitor, which is configured to cooperate therewith to reset an energy from said transformer; and a logic control unit coupled to said switch to keep said reset capacitor with a sufficient reset voltage when input power of said forward converter drops to a certain voltage.

10. The forward converter as recited in claim 9 wherein said DC power source can be either an output of a battery, a power factor correction converter (PFC) or a DC/DC converter.

11. The forward converter as recited in claim 9 wherein said reset circuit further comprises a logic control unit coupled to said switch which is configured to control a reset voltage of said voltage reset circuit to keep said reset capacitor with a sufficient reset voltage when an input power of said forward converter drops to a certain voltage.

12. The forward converter as recited in claim 9 wherein said diode is selected from a group consisting of:

a single diode;

a body diode of a metal-oxide-semiconductor field-effect transistor; and a zener diode.

13. The forward converter as recited in claim 12 wherein a resistor is further connected in parallel with said diode.

14. The forward converter as recited in claim 11 wherein said logic control unit comprises a zener diode and a transistor which is biased through said zener diode.

* * * * *